Jan. 27, 1970     L. PHILLIPS, JR     3,492,448

CIRCUIT BREAKER INTERLOCK

Filed May 9, 1968

INVENTOR.
LAWRENCE PHILLIPS, JR.

BY

*Christie, Parker & Hale*
ATTORNEYS

United States Patent Office

3,492,448
Patented Jan. 27, 1970

3,492,448
CIRCUIT BREAKER INTERLOCK
Lawrence Phillips, Jr., 840 Inverness,
Pasadena, Calif. 91103
Filed May 9, 1968, Ser. No. 727,973
Int. Cl. H01h 9/20, 33/46
U.S. Cl. 200—50    3 Claims

ABSTRACT OF THE DISCLOSURE

The interlock is used with laterally spaced switching elements to prevent the simultaneous energization of the circuit breakers which they control. The interlock is in the form of a locking plate pivotally mounted between the switching elements to move into the path of one of the elements when the other is switched to a preselected switching position. The plate is maintained in its locking position by the switching element in its preselected switching position.

BACKGROUND OF THE INVENTION

This invention relates to interlocking devices which prevent the actuation of one circuit breaker when a commentary circuit breaker is actuated.

There are instances where it is undesirable to simultaneously energize a pair of independent electric circuits. One such instance is commonly found in trailer homes provided with electric generating units and alternate circuitry for drawing power from an outside power source. If both circuits were inadvertently energized, damage to the generating unit could result. In addition, the inadvertent coupling of the two circuits may create a hazard because the neutral conductor of a multiphase power supply may become "hot."

In the past, it was customary to provide a double throw safety switch to disconnect one independent power source before the other independent power source was energized. Fuses were used for circuit protection. Double throw safety switches prevent the inadvertent simultaneous energization of two electric circuits, but they have proven unsatisfactory in other respects. Initially, safety switches require fusing for circuit protection which is not required with circuit breakers. In addition, safety switches are often relatively large and therefore present space limitations. It is, therefore, highly desirable to utilize circuit breakers to provide switching and circuit protection for independent circuits.

To utilize circuit breakers for switching and circuit protection of two independent power circuits which cannot be simultaneously energized, requires a simple, inexpensive and positively acting interlock to prevent the simultaneous activation of the circuit breakers and the energization of the circuits which they control.

SUMMARY OF THE INVENTION

This invention provides an interlock for preventing the actuation of more than one of a laterally spaced pair of toggle-type switching elements of the type which are reciprocally movable in parallel between their "on" and "off" positions.

The interlock of the invention contemplates a locking plate which is pivotally mounted between the toggle-type switching elements of a pair of side-by-side circuit breakers. The pivot point and shape of the plate are such that a portion of the plate interferes with the movement of one of the switching elements when the other is in an actuated position.

In greater detail, the locking plate has first and second perpendicular locking surfaces disposed in the lines of movement of the toggle-type switching elements of a first and second circuit breaker when the switching elements are in a side-by-side first position. Movement of the first switching element to its alternate second position pivots the locking plate such that one of its locking surfaces abuts the interior side of the first switching element in its second position. The other locking surface or edge of the locking plate is then in the path of the second switching element, which is still in its first position, to block movement of the second switching element to its alternate second position. When the first switching element is returned to its first position, the second switching element may be moved to its second position. As the second switching element moves to its second position, it rotates the locking plate to prevent movement of the first switching element. To effect this locking action, the locking surfaces of the locking plate are disposed at right angles to each other with the perpendicular distance between the pivot and the locking surfaces being essentially equal to the corresponding perpendicular distance from the interior sides of the switching elements in their second position to the pivot point.

The interlock's simplicity makes it ideal for use with side-by-side circuit breakers having toggle-type switching elements to prevent the actuation of both circuit breakers at one time. The positive physical barrier provided by the locking plate insures against undesirable switching of the circuit breaker's switching elements. One ideal application is in a two-circuit trailer home where power may be drawn from a generating plant as well as from an outside source. In such an application, two side-by-side circuit breakers are used with the interlock to prevent energization of one power source while the alternate power source is being used.

These and other features, aspects and advantages of the present invention will become more apparent from the following description, appended claims and drawings.

DESCRIPTION OF THE PREFERRED EMBODIMENTS

Figure 1:
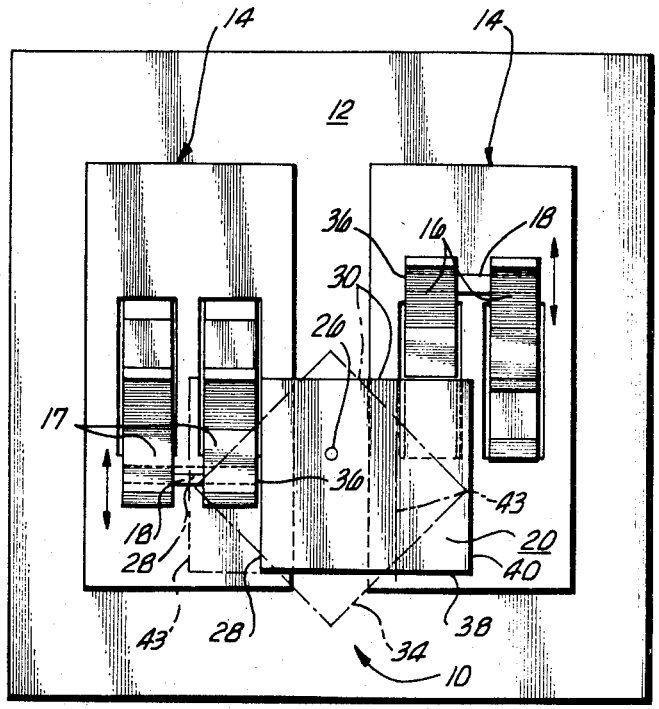
FIGURE 1 is a plan view of an interlock constructed in accordance with the present invention, showing in solid lines the interlock in its locking position and in phantom lines the interlock in its unlocked position.
Figure 2:
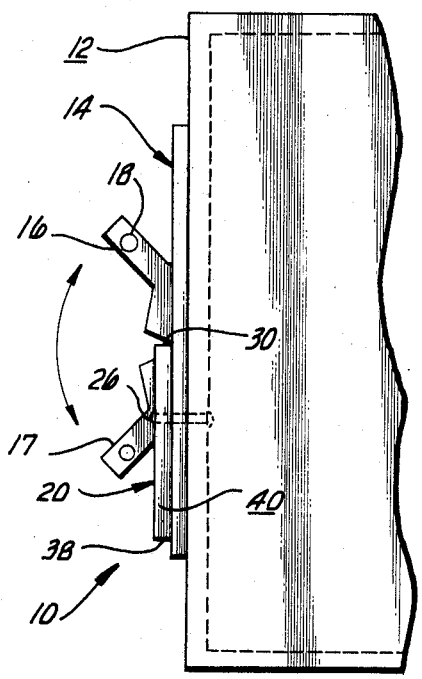
FIGURE 2 is a side elevational view of the interlock shown in FIGURE 1.

FIGURES 1 and 2 illustrate an interlock 10 constructed in accordance with the present invention. The interlock is installed on a circuit breaker case 12. A pair of laterally spaced switches for a pair of conventional circuit breakers 14 extend through circuit breaker case 12. Each of these switches includes a pair of laterally spaced toggle-type switching elements 16 and 17. Each switching element of an associated pair is ganged to its other switching element by a cross bar 18. The ganged switching elements are then actuatable simultaneously. The switching elements are reciprocally actuatable in a conventional manner between their "on" and "off" positions. The circuit breakers are arranged so that the switching element pairs 16 and 17 move between their "on" and "off" positions in parallel paths.

Interlock 10 includes a locking plate 20 which, in the presently preferred embodiment, has a rectangular configuration. A fastener, such as a rivet 26, is anchored in case 12 to provide a pivot for the locking plate and to secure the locking plate in place.

Two intersecting sides of rectangular locking plate 20 define a first locking edge 28 and a second locking edge 30. Rivet 26 is equally spaced from the first and second locking edges 28 and 30.

The perpendicular distance between pivot 26 and each of the locking edges 28 and 30 is approximately the same as but no greater than the corresponding perpendicular distance between an inner side 36 of each of the switching elements 16 and 17 and the pivot. The perpendicular distance between the rivet and remote edges 38 and 40 of the locking plate is greater than the corresponding distance between the rivet and the locking edges 28 and 30. This enables locking edge 28 to extend into the path of switching elements 17 or locking edges 30 into the path of switching elements 16.

When the switching elements of both circuit breakers are in their "up," side-by-side position, which may correspond to their "off" position, the lockinge plate is free to pivot about the rivet. This position of locking plate 20 is shown in FIGURE 1 in phantom lines and indicated by reference numeral 34. When the locking plate is in this free position, the switching elements of either circuit breaker can be moved downwardly into their "on" position.

Locking plate 20 can be pivoted from its unlocked position into the locking position, shown in solid lines in FIGURE 1, by downward movement of switching elements 17. After this movement of switching elements 17, locking edge 28 is approximately parallel to and abutting side 36 of these switching elements. Locking edge 30 extends transversely across the line of movement of switching elements 16 to prevent their movement from, for example, "off" to "on." Until switching elements 17 are switched to their "off" upper position, it is impossible to actuate switching elements 16.

If it is desired to energize the circuit controlled by switching elements 16, switching elements 17 are returned to their upper 'off' position. An operator then moves switching elements 16 downwardly into their "on" position. During this movement switching elements 16 engage locking surface 30 to pivot locking plate 20 about rivet 26 until locking surface 30 is substantially parallel to and abuts side 36 of these switching elements. This position is indicated in FIGURE 1 by reference numeral 43. In this position, locking surface 28 extends transversely across the path of switching elements 17 to prevent their movement and the energization of their controlled circuit breaker.

In short, as long as one pair of the switching elements are in their "on" position, it is impossible to actuate the circuit breaker controlled by the other. Only after the switching elements of a closed circuit breaker have been returned to their "off" position is it possible to energize the circuit controlled by the other circuit breaker.

Figure 3:
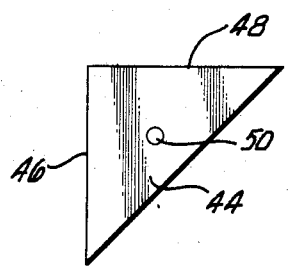
FIGURE 3 is a partial plan view of another embodiment of the interlock.

FIGURE 3 illustrates another embodiment of this invention. A locking plate 44 in the form of an isosceles right triangle is provided in which locking surfaces 46 and 48 are defined by perpendicular sides of the triangle. A hole 50 is provided for a fastener similar to rivet 26 shown in FIGURES 1 and 2. The relation of the locking surfaces of this locking plate to its fastener and switching elements is identical to that of the rectangular locking plate illustrated in FIGURES 1 and 2. Functionally, therefore, plate 44 is identical to that of the rectangular locking plate previously described.

The present invention has been described with reference to certain preferred embodiments. The spirit and scope of the appended claims should not, however, be necessarily limited to this description.

What is claimed is:

1. In combination with a first circuit breaker having a first switching element and a second circuit breaker having a second switching element, the first and second switching elements, respectively, being reciprocally movable in mutually parallel, straight and spaced-apart first and second lines of movement between a side-by-side first position and a second position, an improved interlock for preventing the switching element of each circuit breaker from moving to its second position when the switching element of the complementary circuit breaker is in its second position comprising:

a locking plate having first and second mutually perpendicular locking surfaces, the locking plate being pivotally disposed between the lines of movement of the switching elements such that the first and second locking surfaces extend respectively across the first and second lines of movement when both switching elements are in their first position, the perpendicular distance from the pivot point to the first locking surface being at least approximately equal to but no greater than the perpendicular distance from the inside edge of the first switching element in its second position to the pivot point, and the perpendicular distance from the pivot point to the second locking surface being at least approximately equal to but greater than the perpendicular distance from the inside edge of the second switching element in its second position to the pivot point;

whereby the movement of either of the switching elements to its second position from its first position pivots the locking plate into a position with one of the locking surfaces abutting the switching element in the second position and the other locking surface extending across the line of movement of the switching element in the first position to prevent movement of such switching element into the second position.

2. The improved interlock claimed in claim 1 wherein the locking plate has a rectangular configuration and is pivotally connected midway between the lines of movement of the switching elements.

3. The improved interlock claimed in claim 1 wherein the locking plate has an isosceles right triangular configuration and is pivotally connected midway between the lines of movement of the switching elements.

References Cited

UNITED STATES PATENTS

| | | |
|---|---|---|
| 3,086,090 | 4/1963 | Carroll. |
| 3,319,020 | 5/1967 | Shaffer. |
| 3,432,628 | 3/1969 | Puetz. |
| Re. 26,113 | 11/1966 | Carter et al. |
| 2,557,351 | 6/1951 | Jacobson. |
| 3,164,688 | 1/1965 | Jozefowski. |

ROBERT K. SCHAEFER, Primary Examiner

ROBERT A. VANDERHYE, Assistant Examiner

CERTIFICATE OF CORRECTION

Patent No. 3,492,448   Dated January 27, 1970

Inventor(s) Lawrence Phillips, Jr.

It is certified that error appears in the above-identified patent and that said Letters Patent are hereby corrected as shown below:

In the specification: Column 1, lines 24 and 25, "commentary" should be --complementary--. Column 3, line 12, "edges" should be --edge--; line 16, "lockinge" should be --locking--.

In the claims: Claim 1, column 4, line 31, before "greater" insert --no--.

SIGNED AND
SEALED

JUL 28 1970

(SEAL)
Attest:

Edward M. Fletcher, Jr.
Attesting Officer

WILLIAM E. SCHUYLER, JR.
Commissioner of Patents